(12) United States Patent
Liu et al.

(10) Patent No.: US 12,234,014 B2
(45) Date of Patent: Feb. 25, 2025

(54) UAV NAVIGATION CALIBRATION METHOD, NON-TRANSITORY COMPUTER-READABLE STORAGE MEDIUM AND UAV IMPLEMENTING THE SAME

(71) Applicant: Shenzhen Reolink Technology Co., Ltd., Shenzhen (CN)

(72) Inventors: Xiaoyu Liu, Shenzhen (CN); Sheng Yong, Shenzhen (CN); Rui Zhou, Shenzhen (CN); Yulong Que, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 311 days.

(21) Appl. No.: 17/940,015

(22) Filed: Sep. 8, 2022

(65) Prior Publication Data
US 2023/0051574 A1 Feb. 16, 2023

Related U.S. Application Data

(63) Continuation-in-part of application No. 17/585,505, filed on Jan. 26, 2022, now abandoned.

(30) Foreign Application Priority Data

Aug. 16, 2021 (CN) .......................... 202110935319.3

(51) Int. Cl.
*B64C 39/02* (2023.01)
*B64D 47/00* (2006.01)
*G05D 1/00* (2024.01)

(52) U.S. Cl.
CPC ............ *B64C 39/024* (2013.01); *B64D 47/00* (2013.01)

(58) Field of Classification Search
None
See application file for complete search history.

(56) References Cited

U.S. PATENT DOCUMENTS

| 2014/0032021 A1* | 1/2014 | Metzler ............... G05D 1/0033 |
| | | 701/3 |
| 2018/0164341 A1 | 6/2018 | Anderson et al. |
| 2021/0088550 A1 | 3/2021 | Sato |

FOREIGN PATENT DOCUMENTS

| CN | 101887068 A | 11/2010 |
| CN | 102313822 A | 1/2012 |

(Continued)

OTHER PUBLICATIONS

Yu Weibo et al., Magnetic heading measurement method of rotating projectile based on sensor zero output, Journal of Detection and Control, Issue 01, Feb. 15, 2009, the whole document.

(Continued)

*Primary Examiner* — Walter L Lindsay, Jr.
*Assistant Examiner* — Geoffrey T Evans
(74) *Attorney, Agent, or Firm* — ScienBiziP, P.C.

(57) ABSTRACT

This application discloses a calibration method for navigation of an UAV including a vector sensor. The calibration method includes: collecting, during a flight of the UAV, a current correction value and current data during a current measurement performed by the vector sensor; acquiring previous data during a previous measurement performed by the vector sensor; acquiring an adjustment quantity according to the current data and the previous data; acquiring a next correction value according to the current correction value and the adjustment quantity; and acquiring next original data during a next measurement performed by the vector sensor, acquiring next valid data according to the next original data and the next correction value, and controlling headings and postures of the UAV according to the next valid data. With (Continued)

the calibration method of this application, the next valid data $V_{k+1}$ more closely approximated to a true value can be obtained.

18 Claims, 8 Drawing Sheets

(56) References Cited

FOREIGN PATENT DOCUMENTS

| CN | 103591973 A | 2/2014 |
|---|---|---|
| CN | 103808349 A | 5/2014 |
| CN | 104613936 A | 5/2015 |
| CN | 106199758 A | 12/2016 |
| CN | 106802157 A | 6/2017 |
| CN | 107515011 A | 12/2017 |
| CN | 108051761 A | 5/2018 |
| CN | 108286987 A | 7/2018 |
| CN | 108801292 A | 11/2018 |
| CN | 109000612 A | 12/2018 |
| CN | 110319851 A | 10/2019 |
| CN | 111006691 A | 4/2020 |
| CN | 111521196 A | 8/2020 |
| DE | 1193256 B | 5/1965 |
| GB | 201003915 | 4/2010 |
| JP | 2006071473 A | 3/2006 |
| JP | 2021056002 A | 4/2021 |
| RU | 2432595 C1 | 10/2011 |

OTHER PUBLICATIONS

Lin Chunsheng et al., Quadrature error analysis and correction of triaxial magnetometer, Journal of Detection and Control, Issue 02, Jun. 30, 2005, the whole document.

* cited by examiner

UAV NAVIGATION CALIBRATION METHOD, NON-TRANSITORY COMPUTER-READABLE STORAGE MEDIUM AND UAV IMPLEMENTING THE SAME

CROSS-REFERENCE TO RELATED APPLICATIONS

The present application is continuation-in-part of the U.S. Non-Provisional patent application Ser. No. 17/585,505, filed Jan. 26, 2022, which claims priority from the Chinese Invention Patent Application No. 202110935319.3 filed Aug. 16, 2021, and the disclosures of which are incorporated herein by reference in their entireties.

FIELD OF THE INVENTION

This application relates to the field of unmanned aerial vehicle (UAV) navigation sensors, and more specifically, to a calibration method for navigation of an unmanned aerial vehicle (UAV), a non-transitory computer-readable storage medium and a UAV implementing the same.

BACKGROUND OF THE INVENTION

During a flight of a UAV, to provide precise navigation paths, various types of vector sensor are required to measure headings and postures of the UAV in real time. A vector sensor can provide a direction and a size of a to-be-measured physical quantity. For example, a three-axis magnetoresistive vector sensor capable of measuring the direction of the earth magnetic field is used to manufacture a compass to achieve azimuth measurement. For another example, a three-axis acceleration vector sensor capable of measuring the gravity acceleration of the earth provides an angle of inclination relative to a horizontal plane. However, when the to-be-measured physical quantity is zero, data output of a vector sensor is often not zero, that is, a zero-point error exists, accuracy of UAV navigation is affected.

SUMMARY OF THE INVENTION

According to the first aspect of the present invention, an unmanned aerial vehicle (UAV) is provided. The UAV comprises a vector sensor for measuring headings and postures of the UAV; and one or more processors configured to: collect, during a flight of the UAV, a current correction value $E_k$ and current data during a current measurement performed by the vector sensor; acquire previous data during a previous measurement performed by the vector sensor; acquire an adjustment quantity $W_k$ according to the current data and the previous data; acquire a next correction value $E_{k+1}$ according to the current correction value $E_k$ and the adjustment quantity $W_k$, and acquire next original data $R_{k+1}$ during a next measurement performed by the vector sensor, and acquire next valid data $V_{k+1}$ according to the next original data $R_{k+1}$ and the next correction value $E_{k+1}$; and control headings and postures of the UAV according to the next valid data $V_{k+1}$. The current data comprises current original data $R_k$ and the previous data comprises previous original data $R_{k-1}$. The one or more processors are further configured to: acquire a weight $D_k$ and an estimated quantity $M_k$ according to the current original data $R_k$ and the previous original data $R_{k-1}$; and acquire the adjustment quantity $W_k$ according to the weight $D_k$ and the estimated quantity $M_k$.

According to the second aspect of the present invention, a calibration method for navigation of an unmanned aerial vehicle (UAV) is provided. The UAV includes a vector sensor for measuring headings and postures of the UAV. The calibration method comprises: collecting, during a flight of the UAV, a current correction value $E_k$ and current data during a current measurement performed by the vector sensor; acquiring previous data during a previous measurement performed by the vector sensor; acquiring an adjustment quantity $W_k$ according to the current data and the previous data; acquiring a next correction value $E_{k+1}$ according to the current correction value $E_k$ and the adjustment quantity $W_k$, and acquiring next original data $R_{k+1}$ during a next measurement performed by the vector sensor, and acquiring next valid data $V_{k+1}$ according to the next original data $R_{k+1}$ and the next correction value $E_{k+1}$; and controlling headings and postures of the UAV according to the next valid data $V_{k+1}$. The current data comprises current original data $R_k$, the previous data comprises previous original data $R_{k-1}$. The acquiring the adjustment quantity $W_k$ according to the current data and the previous data comprises: acquiring a weight $D_k$ and an estimated quantity $M_k$ according to the current original data $R_k$ and the previous original data $R_{k-1}$; and acquiring the adjustment quantity $W_k$ according to the weight $D_k$ and the estimated quantity $M_k$.

According to the third aspect of the present invention, a non-transitory computer-readable storage medium storing a computer program is provided. When the computer program is executed by one or more processors, the calibration method for navigation of an unmanned aerial vehicle (UAV) is implemented.

According to the calibration method for navigation of an unmanned aerial vehicle (UAV) in the implementations of this application, the adjustment quantity $W_k$ may be acquired according to the current data collected during a flight of the UAV and the previous data, and the next correction value $E_{k+1}$ may be acquired according to the current correction value $E_k$ and the adjustment quantity $W_k$, to acquire a more accurate correction value, so as to perform zero-point error calibration on the next original data $R_{k+1}$ according to the next correction value $E_{k+1}$ during a next measurement to acquire next valid data $V_{k+1}$ more closely approximating to a true value. Headings and postures of the UAV can be controlled according to the next valid data $V_{k+1}$. Therefore, accuracy of UAV navigation is improved. Moreover, the entire calibration process is carried out in flight state of the UAV without manual intervention, and the calibration method is efficient and convenient.

Additional aspects and advantages of the implementations of this application is provided in the following description.

BRIEF DESCRIPTION OF THE DRAWINGS

The foregoing and/or additional aspects and advantages of this application will become apparent and comprehensible from the descriptions of the implementations below with reference to the accompanying drawings.

DETAILED DESCRIPTION

The following describes embodiments of this application in detail. Examples of the embodiments are shown in the accompanying drawings, and same or similar reference numerals throughout the accompanying drawings indicate same or similar components or components having same or similar functions. The following embodiments described with reference to the accompanying drawings are exemplary, aim to explain this application, and shall not be understood as limiting this application.

Figure 1:
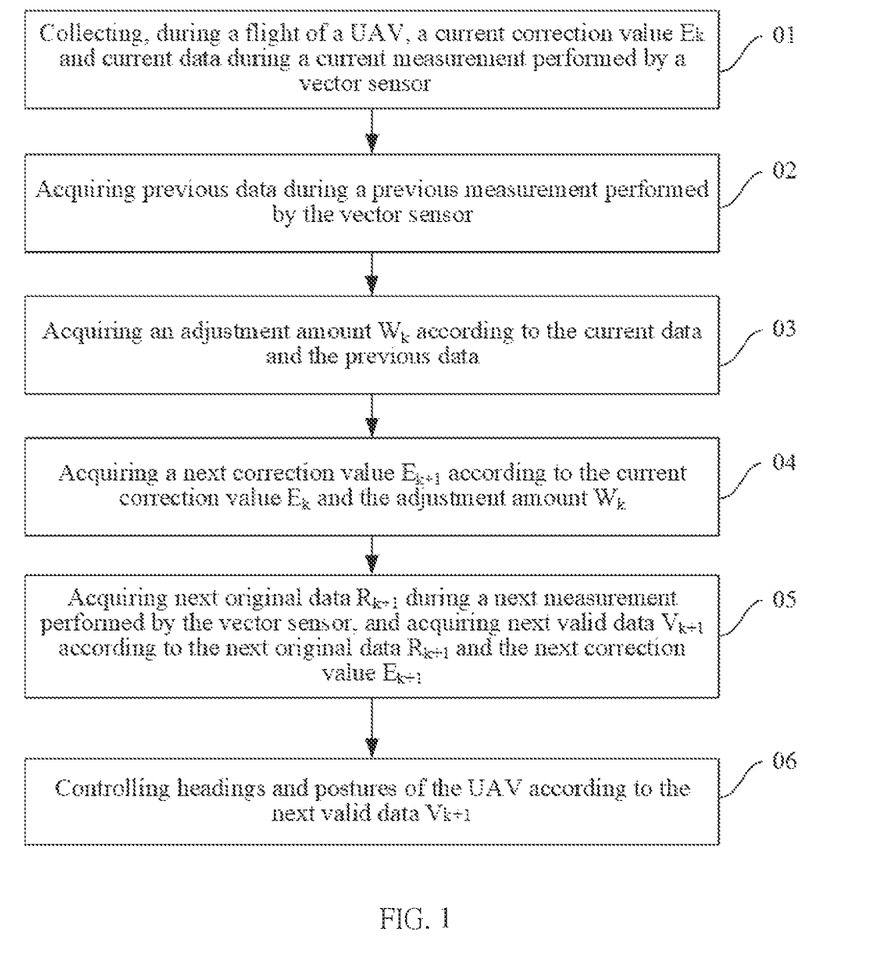
FIG. 1 is a schematic flowchart of a calibration method for navigation of an unmanned aerial vehicle (UAV) according to some implementations of this application.
Figure 2:
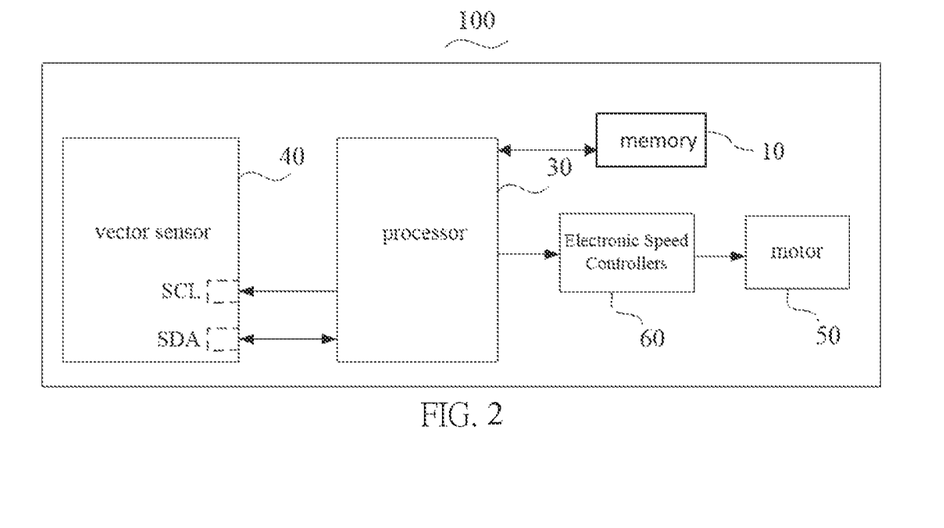
FIG. 2 is a schematic structural diagram of an UAV according to some implementations of this application.

Referring to FIG. 1 and FIG. 2, an implementation of this application provides a calibration method for navigation of an UAV 100 including a vector sensor 40. The vector sensor 40 is configured for measuring headings and postures of the UAV 100. The calibration method includes the following steps:

01: Collecting, during a flight of the UAV 100, a current correction value $E_k$ and current data during a current measurement performed by the vector sensor 40.

02: Acquiring previous data during a previous measurement performed by the vector sensor 40.

03: Acquiring an adjustment quantity $W_k$ according to the current data and the previous data.

04: Acquiring a next correction value $E_{k+1}$ according to the current correction value $E_k$ and the adjustment quantity $W_k$.

05: Acquiring next original data $R_k$ during a next measurement performed by the vector sensor 40, and acquiring next valid data $V_{k+1}$ according to the next original data $R_{k+1}$ and the next correction value $E_{k+1}$.

06: Controlling headings and postures of the UAV 100 according to the next valid data $V_{k+1}$.

Referring to FIG. 2, an implementation of this application further provides an UAV 100. The UAV 100 includes one or more vector sensors 40, a processor 30, a memory 10, one or more electric motors 50 and one or more electronic speed controllers (ESCs) 60. Each ESC 60 acts as interface between the processor 30 and a corresponding electric motor 50. The processor 30 acts as a master and the vector sensors 40 act as slaves. Each of the vector sensors 40 may include a serial clock (SCL) pin and a serial data (SDA) pin corresponding respectively to a serial clock line and a serial data line over a I2C bus used communicate with the processor 30.

When the SCL pin is at a high level, the processor 30 determines a binary value of a corresponding bit by detecting a level on the SDA pin, so as to collect original heading data and original posture data measured by the vector sensor 40. Then the original heading data and the original posture data are calibrated to obtain target heading data and target posture data. The processor 30 generates a control command according to the calibrated target heading data and target posture data and transmits it to the ESC 60. The ESC 60 is configured to control the electric motor 50 to rotate at a speed according to the control command generated by the processor 30 to drive flying motion parts (such as propellers) of the UAV 100, so as to translate or rotate the UAV 100, and adjust to the target heading and posture to achieve navigation calibration. That is to say, the processor 30 may be configured to: collect, during a flight of the UAV, the current correction value $E_k$ and the current data during the current measurement performed by the vector sensor 40; acquire the previous data during the previous measurement performed by the vector sensor 40;

acquire the adjustment quantity $W_k$ according to the current data and the previous data; acquire the next correction value $E_{k+1}$ according to the current correction value $E_k$ and the adjustment quantity $W_k$; and acquire the next original data $R_{k+1}$ during the next measurement performed by the vector sensor 40, acquire the next valid data $V_{k+1}$ according to the next original data $R_{k+1}$ and the next correction value $E_{k+1}$, and control headings and postures of the UAV according to the next valid data $V_{k+1}$.

In this implementation, UAV refers to any types of unmanned aerial vehicle which may be used in various fields such as aerial photography, surveillance, agriculture, plant protection, courier transportation, disaster rescue, observation of wild animals, surveying and mapping, and news reporting. For example, in home surveillance, UAVs can refer to indoor flying security cameras that fly along a customized flight path to see what is happening in the home no matter where the user is. In the field of plant protection, UAVs can refer to plant protection drones, which are used to perform spraying operations according to set flight routes, such as the spraying of pesticides. Due to external electronic equipment, magnetic field interference and other reasons, navigation system of UAV often has errors which affect the flight path planning and flight safety of the UAV. Therefore, calibration of navigation of the UAV is needed to be carried out, that is to calibrate the heading and posture of the UAV.

The vector sensor 40 may be a vector sensor 40 having two or more two axes, for example, a two-axis sensor, a three-axis sensor, a six-axis sensor, or a multi-axis sensor, which is not enumerated herein. Depending on a type of a to-be-measured vector, the vector sensor 40 may selectively be a geomagnetic sensor, a gravity acceleration sensor, an angular velocity sensor, an acceleration sensor, or the like, which is not enumerated herein. In some implementations, the vector sensor 40 may be a micro-electro-mechanical system (MEMS) sensor. The MEMS sensor may be configured to measure one or more types of vectors. For example, the MEMS sensor includes six axes, and can have functions of both a three-axis acceleration sensor and a three-axis geomagnetic sensor. The specific type of the MEMS sensor is not limited thereto, and is not enumerated herein.

In this implementation, the vector sensor 40 may be a combination sensor of a three-axis geomagnetic sensor and a three-axis acceleration sensor, for example. Since the three-axis geomagnetic sensor is a sensor for measuring heading, and the three-axis acceleration sensor is a sensor for measuring posture, Therefore, the processor 30 can collect the heading data and posture data of the UAV at any time through the combined sensor. Specifically, current original data $R_k$ may include current original heading data and current original posture data, previous original data $R_{k-1}$ may include previous original heading data and previous original posture data, next original data $R_{k+1}$ may include next original heading data and next original posture data; current valid data $V_k$ may include current target heading data and current target posture data, previous valid data $V_{k-1}$ may include previous target heading data and previous target posture data, next valid data $V_{k+1}$ may include next target heading data and next target posture data. During current calibration, the processor 30 may determine the UAV's current target heading and current target posture according to the current valid data $V_k$, and then control the UAV to translate or rotate, so that the UAV is adjusted to have the current target heading and current target posture. Similarly, during next calibration, the processor 30 may determine the UAV's next target heading and next target posture according to the next valid data $V_{k+1}$, and then control the UAV to translate or rotate, so that the UAV is adjusted to have the next target heading and next target posture. As such, calibration of heading and posture of the UAV is realized. During the flight of the UAV, through the calibration of the headings and postures of the UAV, the accuracy of UAV navigation is improved. Moreover, the entire calibration process is carried out in flight state of the UAV, no manual intervention is required, thus efficiency and convenience of the calibration can be enhanced.

Referring to FIG. 2, in an embodiment, the processor 30 and the vector sensor 40 are integrally disposed. In another embodiment, the processor 30 and the vector sensor 40 are independently disposed. The vector sensor 40 may transmit the measurement data to the processor 30. The processor 30 acquires the next correction value $E_{k+1}$ according to data measured by the vector sensor 40, and transmits the next correction value $E_{k+1}$ to the vector sensor 40, so that the vector sensor 40 acquires the next valid data $V_k$ based on the next correction value $E_{k+1}$. Alternatively, the processor 30 side acquires the next valid data $V_{k+1}$ according to the next correction value $E_{k+1}$ and the next original data $R_{k+1}$ acquired by the vector sensor 40.

Figure 3:
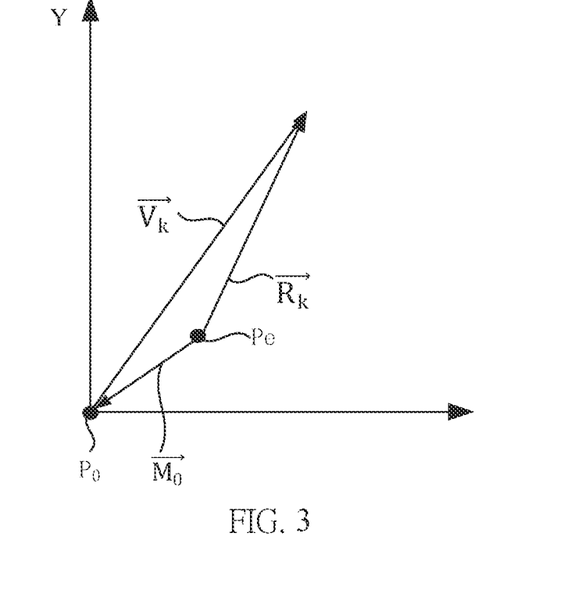
FIG. 3 is a schematic diagram of a scenario in which a vector sensor acquires original data $R_k$ and valid data $V_k$ according to some implementations of this application.

Referring to FIG. 3, Generally, a zero-point offset $M_0$ exists between a theoretical zero-point position $P_0$ of the vector sensor 40 and a measurement zero-point position Pe adopted during the measurement performed by the vector sensor 40. Specifically, the vector sensor 40 can still acquire non-zero data when the to-be-measured vector is zero. A vector difference between the vector data acquired by the vector sensor 40 and zero is the zero-point offset $M_0$ of the vector sensor 40. If the vector sensor 40 adopts the theoretical zero-point position during measurement, the vector data acquired by the vector sensor 40 is zero when the to-be-measured vector is zero. That is to say, the vector data acquired by the vector sensor 40 can represent the real to-be-measured vector.

Since the zero-point offset $M_0$ is the vector difference between the theoretical zero-point position $P_0$ and the measurement zero-point position Pe, and the original data $R_k$ acquired based on the measurement zero-point position Pe can reflect the zero-point position Pe, the theoretical zero-point position $P_0$ can be determined by using the zero-point offset $M_0$ based on the original data $R_k$ acquired by the vector sensor 40 if the zero-point offset $M_0$ can be determined, thereby acquiring the accurate valid data $V_k$. The valid data $V_k$ is data acquired based on an actual zero-point position of the vector sensor 40, that is, data acquired after a zero-point error is eliminated.

Specifically, referring to FIG. 2 and FIG. 3, the original data $R_k$ measured by the two-axis vector sensor 40 based on the measurement zero-point position Pe is used as an example. In a coordinate system of the two-axis vector sensor 40, $P_0$ is the theoretical zero-point position, Pe is the measurement zero-point position, the zero-point offset $M_0$ is the vector difference between the theoretical zero-point position $P_0$ and the measurement zero-point position Pe, and $V_k$ is theoretical vector data that can be acquired based on the theoretical zero-point position $P_0$, which is a theoretical vector after the zero-point error of $\vec{R_k}$ is eliminated. It can be learned that, $P_0=Pe+\vec{M_0}$, $\vec{V_k}=\vec{R_k}-\vec{M_0}$. Therefore, the zero-point error of the original data $\vec{R_k}$ can be eliminated to obtain the vector data $\vec{V_k}$ if the zero-point offset $\vec{M_0}$ can be determined, and the vector data $\vec{V_k}$ is outputted as at the valid data to acquire an accurate measurement vector.

Figure 4:
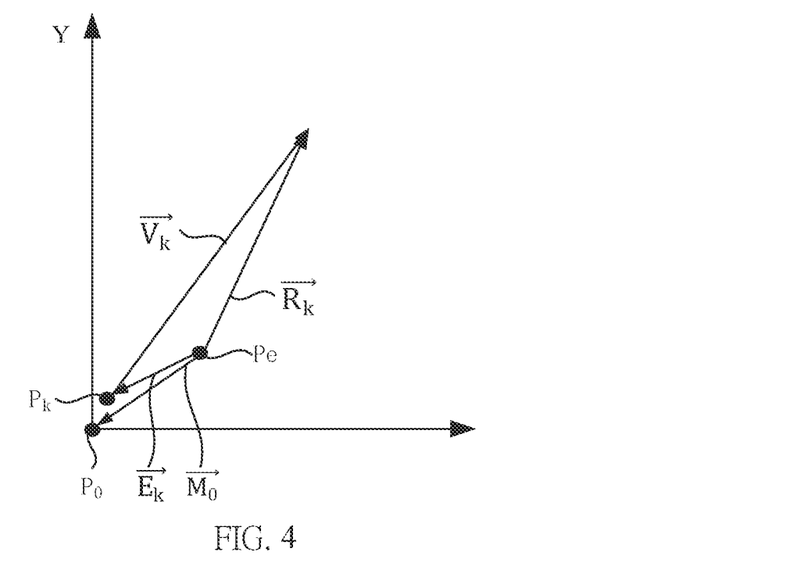
FIG. 4 is a schematic diagram of a scenario in which a vector sensor acquires original data $R_k$ and valid data $V_k$ according to some implementations of this application.

Referring to FIG. 4, according to the calibration method in the implementations of this application, the current correction value $\vec{E_k}$ and the current data may be obtained, and the current data may include current original data $\vec{R_k}$ obtained by the vector sensor 40 during a current measurement. The current correction value $\vec{E_k}$ is an estimated value of the zero-point offset $\vec{M_0}$, and the correction value $\vec{E_k}$ represents the vector difference between the measurement zero-point position Pe and an estimated zero-point position $P_k$. During actual measurement, it is usually difficult to directly acquire an accurate zero-point offset $\vec{M_0}$. Therefore, it is necessary to estimate a zero-point position by using the current correction value $\vec{E_k}$. The current valid data $\vec{V_k}$ may be acquired based on the estimated zero-point position $P_k$, the current correction value $\vec{E_k}$, and the current original data $\vec{R_k}$. The current valid data $\vec{V_k}$ is vector data acquired by performing zero-point error calibration on the current original data $\vec{R_k}$, which more closely approximates to an actual value of the to-be-measured vector.

Referring to FIG. 3 and FIG. 4, if the current correction value $\vec{E_k}$ coincides with the zero-point offset $\vec{M_0}$, that is, the current correction value $\vec{E_k}$ is completely accurate, the estimated zero-point position $P_k$ determined according to the current correction value $\vec{E_k}$ coincides with the theoretical zero-point position $P_0$. In this case, the theoretical zero-point position $P_0$ can be determined according to only the current correction value $\vec{E}_k$. That is to say, after the zero-point error calibration is performed on the current original data $\vec{R}_k$ by using the current correction value $\vec{E}_k$, a zero-point error of the current original data $\vec{R}_k$ can be completely eliminated to obtain the current valid data $\vec{V}_k$. The current valid data $\vec{V}_k$ can reflect an actual value of a current measurement result. Similarly, when the next correction value $\vec{E}_{k+1}$ more closely approximates to the zero-point offset $\vec{M}_0$, it indicates that the next correction value $\vec{E}_{k+1}$ is more accurate, and therefore the next valid data $\vec{V}_{k+1}$ acquired based on the next original data $\vec{R}_{k+1}$ and the next correction value $\vec{E}_{k+1}$ acquired during the next measurement is more accurate, which more closely approximates to an actual value of a next measurement result.

Figure 5:
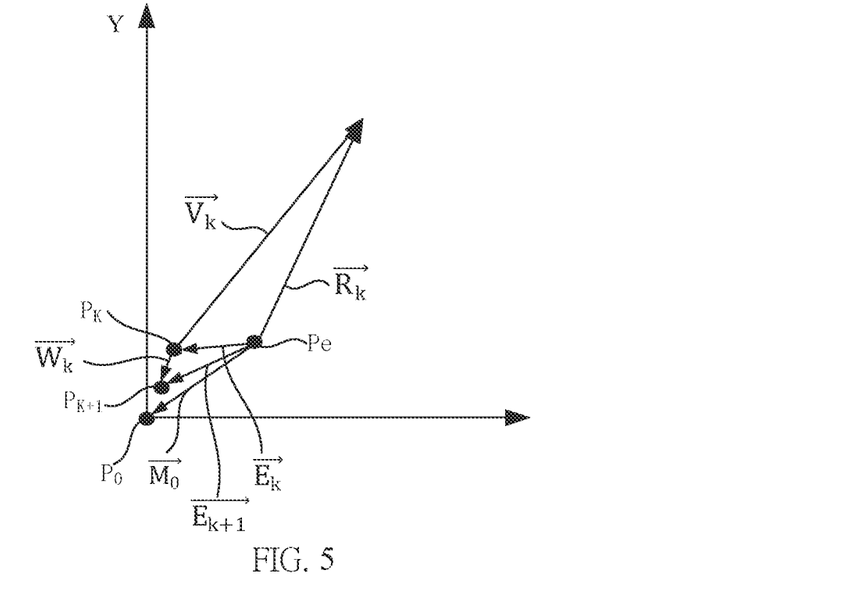
FIG. 5 is a schematic diagram of a zero-point calibration scenario of a vector sensor according to some implementations of this application.

Further, Referring to FIG. 5, according to the calibration method in the implementations of this application, the next correction value $E_{k+1}$ may be acquired according to the current correction value $E_k$ and the adjustment quantity $W_k$, and the adjustment quantity $W_k$ is used to adjust the current correction value $E_k$ to obtain the next correction value $E_{k+1}$. The correction value obtained after the adjustment more closely approximates to the zero-point offset $M_0$. As shown in FIG. 5, the adjustment quantity $W_k$ represents a vector difference between the estimated zero-point position $P_k$ and an estimated zero-point position $P_{k+1}$, and the next correction value $\vec{E}_{k+1}$ is a vector difference between the estimated zero-point position $P_{k+1}$ and the measurement zero-point position Pe. It may be learned that, after the adjustment, the estimated zero-point position $P_{k+1}$ determined according to the next correction value $\vec{E}_{k+1}$ more closely approximates to the theoretical zero-point position $P_0$ than the estimated zero-point position $P_k$ determined based on the current correction value $\vec{E}_k$, and the next correction value $\vec{E}_{k+1}$ more closely approximates to the zero-point offset $\vec{M}_0$. As the measurement number k increases, the correction value is continuously adjusted, so that the newly acquired correction value increasingly approximates the zero-point offset $\vec{M}_0$, that is, the zero-point calibration is becoming more accurate.

According to the calibration method and the UAV 100 in the implementations of this application, the adjustment quantity $W_k$ may be acquired according to the current data and the previous data, and the next correction value $E_{k+1}$ may be acquired according to the current correction value $E_k$ and the adjustment quantity $W_k$, to acquire a more accurate correction value, so as to perform zero-point error calibration on the next original data $R_{k+1}$ according to the next correction value $E_{k+1}$ during a next measurement to acquire next valid data $V_{k+1}$ more closely approximating to a true value. In addition, the zero-point calibration process of the vector sensor 40 is performed while the vector sensor 40 normally outputs data, and therefore does not affect the normal use of the vector sensor 40.

This application is further described below with reference to the accompanying drawings.

Refer to FIG. 1. Method 01: Collecting, during the flight of the UAV, the current correction value $E_k$ and the current data during the current measurement performed by the vector sensor 40. Method 02: Acquiring the previous data during the previous measurement performed by the vector sensor 40. k is a natural number greater than 0, that is, a minimum value of k is 1. k represents a number of measurements. For example, when k=2, a current correction value $E_2$ represents a correction value corresponding to a second measurement, and the adjustment quantity $W_k$ represents an adjustment quantity corresponding to the second measurement.

The correction value may be a preset value. For example, the current correction value $E_k$ is a correction value determined according to a plurality of measurements performed in advance or a correction value determined according to experience. This is not limited herein.

The correction value may alternatively be determined based on an adjustment quantity corresponding to a previous measurement performed by the vector sensor 40. For example, for a next measurement, the current measurement is a previous measurement of the next measurement. Therefore, a next correction value $E_{k+1}$ may be determined according to the current correction value $E_k$ and an adjustment quantity $W_k$ corresponding to the current measurement. In another example, the current correction value $E_k$ may be determined according to a previous correction value $E_{k-1}$ and an adjustment quantity $W_{k-1}$ corresponding to the previous measurement. Specifically, for example, when k=2, the correction value $E_2$ may be determined according to a correction value $E_1$ and an adjustment quantity $W_1$ existing when k=1. In particular, when k=1, the current measurement is a first measurement. Since a correction value $E_0$ and an adjustment quantity $W_0$ corresponding to the previous measurement do not exist, the correction value $E_1$ is a preset value.

In some implementations, a posture of the vector sensor 40 during the previous measurement is different from a posture of the vector sensor 40 during the current measurement.

Figure 6:
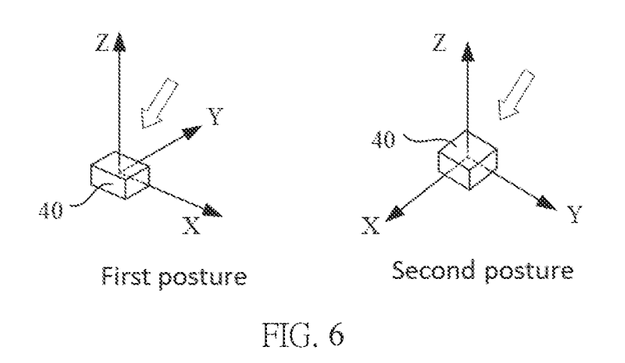
FIG. 6 is a schematic diagram of a scenario of different postures of the vector sensor according to some implementations of this application.

Referring to FIG. 6, specifically, different postures mean postures corresponding to different angles of the reference vector in a preset coordinate system relative to the vector sensor 40. For example, the vector sensor 40 is moved or rotated from a first posture to a second posture relative to a fixed reference vector. For example, the reference vector is an acceleration of gravity, and a direction of the acceleration of gravity is constant. In this case, the vector sensor 40 is moved or rotated relative to the direction of the acceleration of gravity to change the posture. In another example, the vector sensor 40 is not moved or rotated, but the reference vector is moved or rotated relative to the vector sensor 40. For example, the reference vector is an electromagnetic field vector, the vector sensor 40 is placed in a horizontal plane and kept still, and an electromagnetic field source is moved or rotated relative to the vector sensor 40. In this case, an angle of the electromagnetic field vector is changed relative to a coordinate axis of the vector sensor 40. Therefore, it is also considered that the vector sensor 40 is changed relative to the posture of the reference vector. In another example, at least one of the vector sensor 40 or the reference vector is moved or rotated relative to the other. For example, the vector sensor 40 is fixed, and the reference vector is movable, or the vector sensor 40 is movable, and the reference vector is fixed, or the vector sensor 40 and the reference vector are both movable. In all of the above cases, it is considered that the posture of the vector sensor 40 is changed relative to the reference vector.

Figure 7:
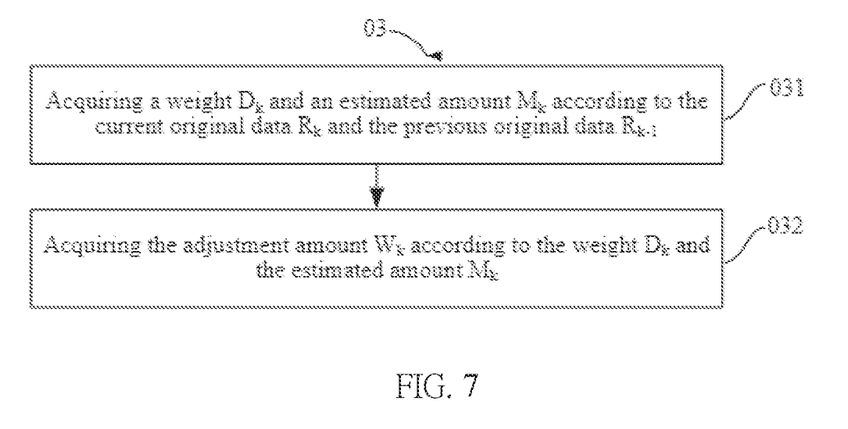
FIG. 7 is a schematic flowchart of a calibration method according to some implementations of this application.

Referring to FIG. 7, in some implementations, the current data includes current original data $R_k$, and the previous data includes the previous original data $R_{k-1}$. 03 of acquiring the adjustment quantity $W_k$ according to the current data and the previous data includes the following steps:

031: Acquiring a weight $D_k$ and an estimated quantity $M_k$ according to the current original data $R_k$ and the previous original data $R_{k-1}$.

032: Acquiring the adjustment quantity $W_k$ according to the weight $D_k$ and the estimated quantity $M_k$.

Referring to FIG. 2, in some implementations, the processor 30 may be further configured to perform the methods in 031 and 032. That is to say, the processor 30 may be further configured to acquire the weight $D_k$ and the estimated quantity $M_k$ according to the current original data $R_k$ and the previous original data $R_{k-1}$, and acquire the adjustment quantity $W_k$ according to the weight $D_k$ and the estimated quantity $M_k$.

Referring to FIG. 5, the adjustment quantity $W_k$ is a vector difference between the next correction value $E_{k+1}$ and the current correction value $E_k$. Specifically, $E_{k+1}=E_k+W_k$. According to the implementations of this application, the adjustment quantity $W_k$ may be acquired according to the weight $D_k$ and the estimated quantity $M_k$.

Figure 8:
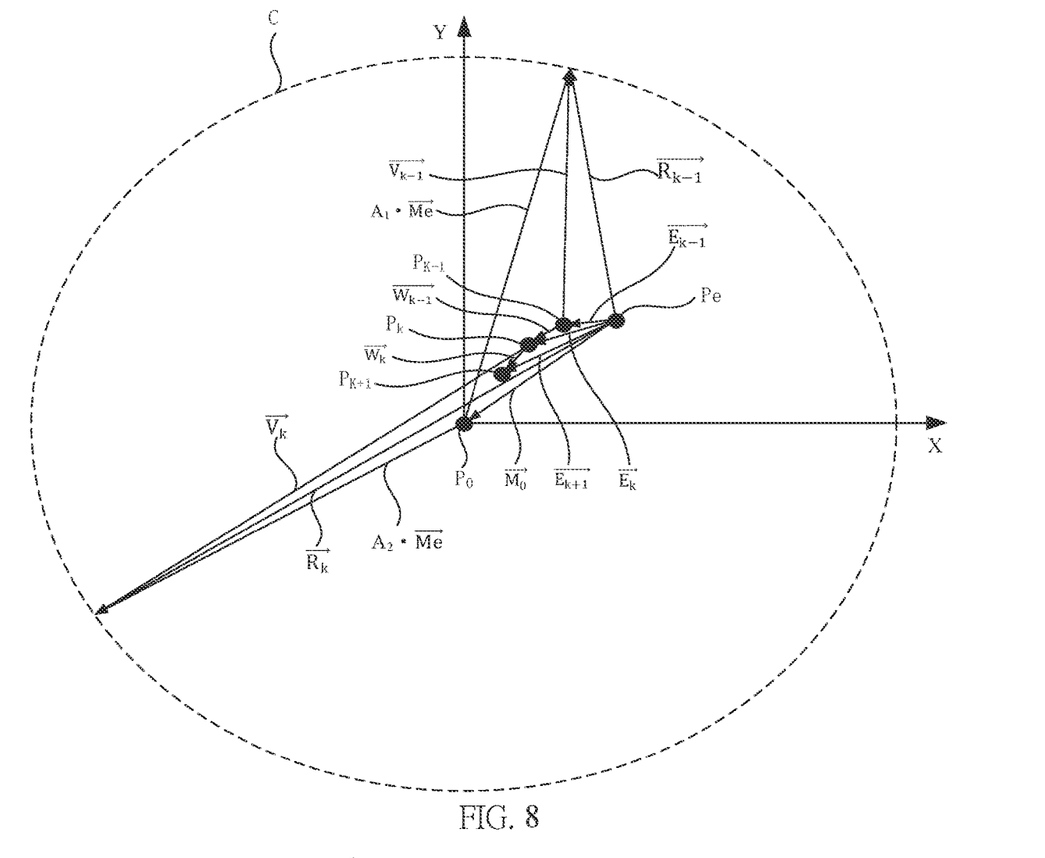
FIG. 8 is a schematic diagram of a scenario in which the vector sensor measures a vector at different postures according to some implementations of this application.

Specifically, referring to FIG. 8, for example, the two-axis vector sensor 40 measures a vector $\vec{Me}$ at different postures and acquires the previous original data $\vec{R}_{k-1}$ and the current original data $\vec{R}_k$. Vector values |Me| of the vector $\vec{Me}$ during the previous measurement and the current measurement are the same. Referring to FIG. 6, directions of the vector $\vec{Me}$ relative to the coordinate system of the vector sensor 40 during the previous measurement and the current measurement are different. For the vector sensor 40, if the zero-point error does not exist, the vector data measured by the vector sensor 40 is a vector pointing to a circumference of a circle C from the theoretical zero-point position $P_0$. The circle C is a circle having $P_0$ as a center and |Me| as a radius. For example, when the zero-point error does not exist, vector data measured by the vector sensor 40 during the previous measurement is $A_1 \cdot \vec{Me}$, and vector data measured during the current measurement is $A_2 \cdot \vec{Me}$. A1 is an external parameter matrix corresponding to the coordinate system of the vector sensor 40 at the posture during the previous measurement, and A2 is an external parameter matrix corresponding to the coordinate system of the vector sensor 40 at the posture during the current measurement. $A_1 \cdot \vec{Me}$ and $A_2 \cdot \vec{Me}$ illustrate a posture changing process of the vector sensor 40 relative to the to-be-measured vector. The previous original data $\vec{R}_{k-1}$ and the current original data $\vec{R}_k$ are vectors measured based on the measurement zero-point position Pe. $\vec{R}_{k-1}$ and $\vec{R}_k$ point to the circumference of the circle C from the zero-point position Pe.

Specifically, referring to FIG. 8, $A_1 \cdot \vec{Me}$ and $A_2 \cdot \vec{Me}$ have the following relationship:

$$A_1 \cdot \vec{Me} = \vec{R}_{k-1} - \vec{M}_0; \qquad \text{Formula I}$$

$$A_2 \cdot \vec{Me} = \vec{R}_k - \vec{M}_0. \qquad \text{Formula II}$$

Formula III is obtained by squaring both sides of the equation of Formula I.

$$|Me|^2 = |\vec{R}_{k-1}|^2 - 2(\vec{R}_{k-1} \cdot \vec{M}_0) + |M_0|^2. \qquad \text{Formula III}$$

Formula IV is obtained by squaring both sides of the equation of Formula II.

$$|Me|^2 = |\vec{R}_k|^2 - 2(\vec{R}_k \cdot \vec{M}_0) + |M_0|^2. \qquad \text{Formula IV}$$

Formula V is obtained by using differences between both sides of each of the equations of Formula III and Formula IV.

$$|\vec{R}_k|^2 - |\vec{R}_{k-1}|^2 = 2(\vec{R}_k - \vec{R}_{k-1}) \cdot \vec{M}_0. \qquad \text{Formula V}$$

Let $\vec{M}_k = \vec{R}_k - \vec{R}_{k-1}$, and $D_k = |\vec{R}_k|^2 - |\vec{R}_{k-1}|^2$. In this case, Formula V may be revised to Formula VI: $D_k = 2(\vec{M}_k \cdot \vec{M}_0)$. $D_k$ is the weight, and $\vec{M}_k$ is the estimated amount.

Figure 9:
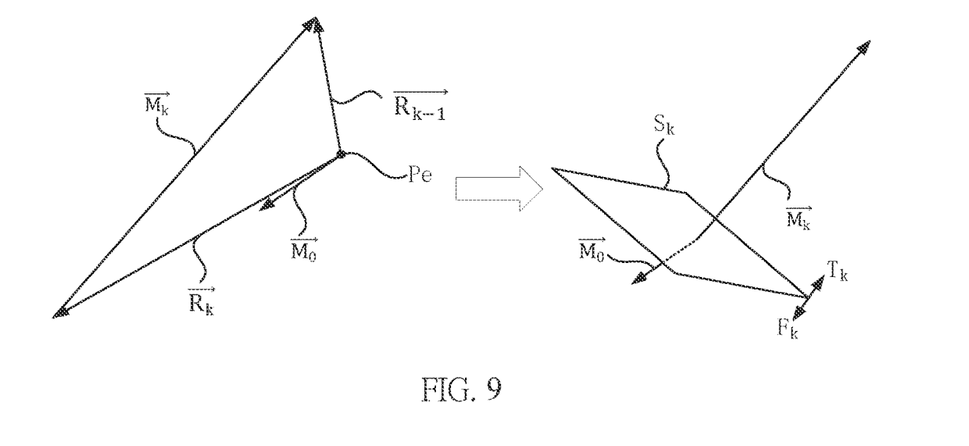
FIG. 9 is a schematic diagram of a scenario of acquiring a direction of a zero-point offset $M_O$ according to some implementations of this application.

According to Formula VI, if $D_k > 0$, that is, $\vec{M}_k \cdot \vec{M}_0 > 0$, it indicates that $\vec{M}_k$ and $\vec{M}_0$ are in a same direction, or if $D_k < 0$, that is, $\vec{M}_k \cdot \vec{M}_0 < 0$, it indicates that $\vec{M}_k$ and $\vec{M}_0$ are in different directions. Referring to FIG. 9, a normal plane $S_k$ of the vector $\vec{M}_k$ segments a space into two parts: a side $T_k$ in a same direction as $\vec{M}_k$ and a side $F_k$ in a direction opposite to that of $\vec{M}_k$. When $\vec{M}_k \cdot \vec{M}_0 > 0$, it may be determined that the direction of $\vec{M}_0$ is on the $T_k$ side. When $\vec{M}_k \cdot \vec{M}_0 < 0$, it may be determined that the direction of $\vec{M}_0$ is on the $F_k$ side.

Figure 10:
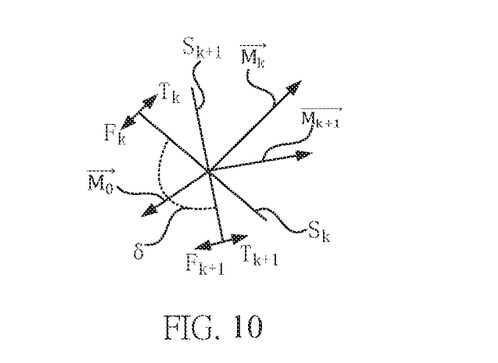
FIG. 10 is a schematic diagram of a scenario of acquiring a direction of a zero-point offset $M_O$ according to some implementations of this application.

Referring to FIG. 10, similarly, after the $(k+1)^{th}$ measurement, the vector sensor 40 acquires data $\vec{R}_{k+1}$. Therefore, $\vec{M}_{k+1}$ and $D_{k+1}$ may be acquired according to $\vec{R}_k$ and $\vec{R}_{k+1}$, where $D_{k+1} = 2(\vec{M}_{k+1} \cdot \vec{M}_0)$. It may be determined according to a sign (i.e., + or −) of $D_{k+1}$ whether the direction of $\vec{M}_0$ is on a $T_{k+1}$ side or an $F_{k+1}$ side of the normal plane $S_{k+1}$ of $\vec{M}_{k+1}$. In the example of FIG. 10, $D_k$ and $D_{k+1}$ are both <0, and it may be determined according to signs of $D_k$ and $D_{k+1}$ that the direction of $\vec{M}_0$ is in a range of δ. As the measurement number k increases, a plurality of directional relationships between the estimated quantity $\vec{M}_k$ and the zero-point offset $\vec{M}_0$ may be determined. That is to say, it may be determined that $\vec{M}_0$ is located on which side of a plurality of half-spaces segmented by the normal plane $S_k$ of $\vec{M}_k$, thereby further determining a range of $\vec{M}_0$ in the space, that is, reducing the range of δ. An intersection of the distributions of $\vec{M}_0$ in the space is acquired to determine a relatively small spatial range, which can reflect the direction of the zero-point offset $\vec{M}_0$.

Figure 11:
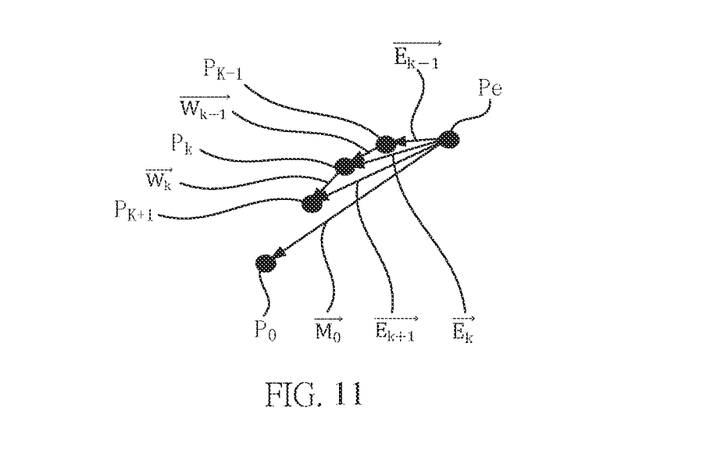
FIG. 11 is a schematic diagram of a zero-point calibration scenario of a vector sensor according to some implementations of this application.

Referring to FIG. 11, the adjustment quantity $W_k$ is used to adjust the correction value $E_k$ to obtain the adjusted correction value $E_{k+1}$. Therefore, the estimated zero-point position $P_{k+1}$ obtained after the correction of the correction value $E_{k+1}$ for the measurement zero-point position Pe more closely approximates to the theoretical zero-point position $P_0$. That is to say, a more accurate direction and magnitude of the obtained correction value $E_{k+1}$ leads to more accurate zero-point calibration. The correction value $E_{k+1} = E_k + W_k$. Therefore, a more accurate direction and magnitude of the adjustment quantity $W_k$ leads to a more accurate direction and magnitude of the obtained correction value $E_{k+1}$ and thereby leads to more accurate zero-point calibration.

The direction of the adjustment quantity $W_k$ depends on a vector direction of the estimated quantity $M_k$ and a sign of the weight $D_k$. Referring to FIG. 9 and FIG. 10, if $D_k<0$, the direction of the adjustment quantity $W_k$ is same as the vector direction of the estimated quantity $M_k$, and the adjustment quantity and the zero-point offset $\vec{M_0}$ are both in a direction toward the $T_k$ side of the normal plane $S_k$ of $M_k$. If $D_k>0$, the direction of the adjustment quantity $W_k$ is opposite to the vector direction of the estimated quantity $M_k$, and the adjustment quantity and the zero-point offset $\vec{M_0}$ are both in a direction toward the $F_k$ side of the normal plane $S_k$ of $M_k$. It may be learned that the direction of the adjustment quantity $W_k$ and the direction of the zero-point offset $\vec{M_0}$ face the same side of the half space defined by the normal plane $S_k$ of $M_k$. Therefore, the direction of the zero-point offset $\vec{M_0}$ may be estimated by using the adjustment quantity $W_k$, that is, a direction of the correction value $E_k$ is adjusted by using the adjustment quantity $W_k$, so that the adjusted direction of the correction value $E_{k+1}$ more closely approximates to the direction of the zero-point offset $\vec{M_0}$. As the measurement number k increases, the range of the zero-point offset $\vec{M_0}$ in the space that can be determined is becoming more accurate, and the adjusted direction of the correction value $E_{k+1}$ more closely approximates to the true direction of the zero-point offset $\vec{M_0}$.

The magnitude of the adjustment quantity $W_k$ depends on the magnitude of the estimated quantity $M_k$ and the weight $D_k$. Specifically, $|\vec{W_k}|=\alpha|D_k||\vec{M_k}|$. $\alpha$ is a preset empirical factor used to avoid an excessively large value of $|\vec{W_k}|$ and avoid an excessively large value of the correction value $E_{k+1}$, and thereby avoid divergence of the estimated zero-point position $P_{k+1}$ and improve a peed of convergence of the zero-point position $P_{k+1}$ to the theoretical zero-point position $P_0$. When the convergence speed is not required, a value of $\alpha$ is 1. $|D_k|$ can reflect a degree of change in the posture of the vector sensor 40 from the previous measurement to the current measurement. $|\vec{M_k}|=|\vec{R_k}-\vec{R_{k-1}}|$ is a differential process. Due to the impact of noise, during actual measurement, $|\vec{M_k}|=|\vec{R_k}-\vec{R_{k-1}}|+Z$, where Z is a noise value. If the degree of change in the posture of the vector sensor 40 from the previous measurement to the current measurement is relatively small, values of $|\vec{R_k}|$ and $|\vec{R_{k-1}}|$ are relatively close, $|\vec{R_k}-\vec{R_{k-1}}|$ is relatively small, and the noise value Z has a relatively large impact on a difference result of $|\vec{M_k}|$, which is likely to cause divergence of the estimated zero-point position $Pp_{k+1}$. When the degree of change in the posture of the vector sensor 40 from the previous measurement to the current measurement is relatively large, the noise value Z has a relatively small impact on the difference result of $|\vec{M_k}|$, so that the estimated zero-point position $P_{k+1}$ can converge to the theoretical zero-point position $P_0$. Therefore, in order to avoid the divergence of the estimated zero-point position $P_{k+1}$, it is necessary to use the adjustment quantity $W_k$ to obtain the correction value $E_{k+1}$ to determine the convergent estimated zero-point position $P_{k+1}$ when the degree of change in the posture of the vector sensor 40 is relatively large. $|D_k|$ is positively correlated with the degree of change in the posture of the vector sensor 40. A larger value of $|D_k|$ indicates a larger degree of change in the posture of the vector sensor 40, and a smaller value of $|D_k|$ indicates a smaller degree of change in the posture of the vector sensor 40. $|\vec{D_k}||\vec{M_k}|$ represents a degree of utilization of $|\vec{M_k}|$. A larger $|D_k|$ indicates a larger degree of utilization of $|\vec{M_k}|$ to the value of $|\vec{W_k}|$, and thereby indicates a larger degree of adjustment of the correction value $E_k$ by the adjustment quantity $W_k$ and a larger distance between the determined estimated zero-point position $P_{k+1}$ and the previous estimated zero-point position $P_k$. A smaller $|D_k|$ indicates a smaller degree of utilization of $|\vec{M_k}|$ to the value of $|\vec{W_k}|$, and thereby indicates a smaller degree of adjustment of the correction value $E_k$ by the adjustment quantity $W_k$ and a smaller distance between the determined estimated zero-point position $P_{k+1}$ and the previous estimated zero-point position $P_k$.

Further, in some embodiments, when $|Dk|$ is greater than the preset threshold, the correction value $E_k$ may be adjusted by using the adjustment quantity $W_k$ to obtain the correction value $E_{k+1}$. When $|Dk|$ is less than or equal to the preset threshold, it may be considered that the correction value $E_k$ does not require correction. The adjustment quantity $W_k$ may be set to zero to cause $E_{k+1}E_k+0=E_k$, or $E_{k+1}=E_k$ may be directly set. In this case, zero-point calibration is not required. When $|D_{k+n}|$ is greater than the preset threshold, the correction value $E_{k+n}$ is acquired by using the adjustment quantity $W_{k+n}$.

Figure 12:
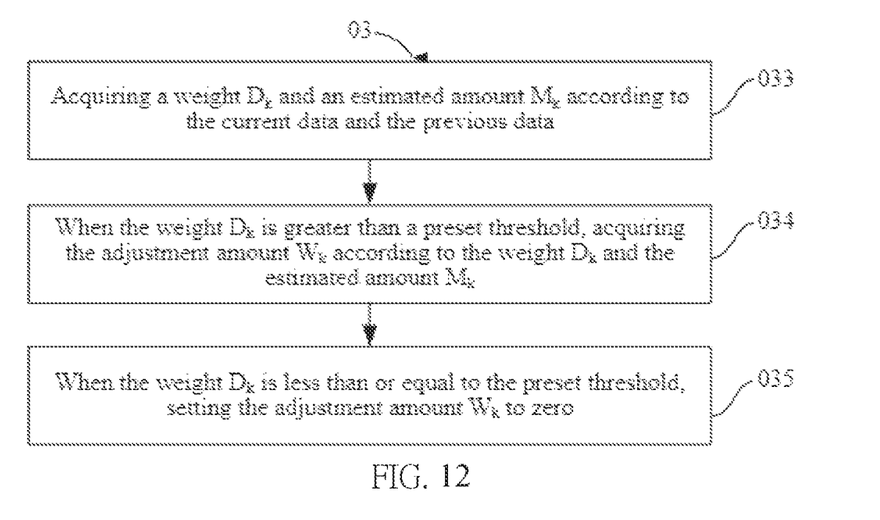
FIG. 12 is a schematic flowchart of a calibration method according to some implementations of this application.

Specifically, referring to FIG. 12, in some implementations, the method 03 of acquiring the adjustment quantity $W_k$ according to the current data and the previous data includes the following steps:

033: Acquiring a weight $D_k$ and an estimated quantity $M_k$ according to the current data and the previous data.

034: When the weight $D_k$ is greater than a preset threshold, acquiring the adjustment quantity $W_k$ according to the weight $D_k$ and the estimated quantity $M_k$.

035: When the weight $D_k$ is less than or equal to the preset threshold, setting the adjustment quantity $W_k$ to zero.

Referring to FIG. 2, in some implementations, the processor 30 may be further configured to perform the methods in 033, 034 and 035. That is to say, the processor 30 may be further configured to: acquire the weight $D_k$ and the estimated quantity $M_k$ according to the current data and the previous data; when the weight $D_k$ is greater than the preset threshold, acquire the adjustment quantity $W_k$ according to the weight $D_k$ and the estimated quantity $M_k$; and when the weight $D_k$ is less than or equal to the preset threshold, set the adjustment quantity $W_k$ to zero.

In this way, it can be ensured that the estimated zero-point position $P_{k+1}$ determined after the zero-point calibration converges to the theoretical zero-point position $P_0$, thereby improving the accuracy of the acquired valid data.

Similarly, when the vector sensor 40 is a vector sensor 40 having more than two axes, the adjustment quantity $W_k$ can still be acquired by using the calibration method in the implementations of this application, and the next correction value $E_{k+1}$ can be acquired according to the adjustment quantity $W_k$ and the current correction value $E_k$. Details are not described herein.

Refer to Formula VI: $D_k=2(\vec{M_k}\cdot\vec{M_0})$. In some implementations, the current data includes the current original data $R_k$ and the current valid data $V_k$, and the previous data includes the previous valid data $V_{k-1}$. The weight $D_k$ and the estimated quantity $M_k$ may be acquired according to the current valid data $V_k$ and the previous valid data $V_{k-1}$.

Figure 13:
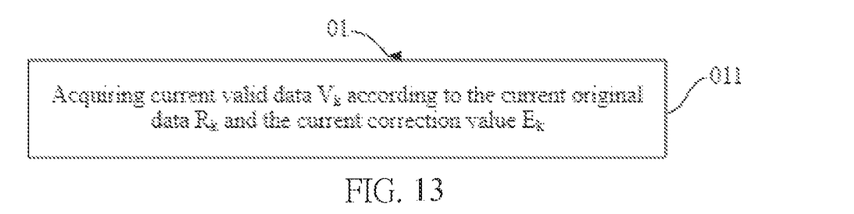
FIG. 13 is a schematic flowchart of a calibration method according to some implementations of this application.

Specifically, referring to FIG. 13, in some implementations, the method 01 of collecting the current correction value $E_k$ and the current data during the current measurement performed by the vector sensor 40 includes the following steps:

011: Acquiring current valid data $V_k$ according to the current original data $R_k$ and the current correction value $E_k$.

Referring to FIG. 2, in some implementations, the processor 30 may be further configured to perform the method in 011. That is to say, the processor 30 may be further configured to: acquire the current valid data $V_k$ according to the current original data $R_k$ and the current correction value $E_k$.

Specifically, referring to FIG. 4, $\vec{V_k} = \vec{R_k} - \vec{E_k}$, which represents a vector pointing to the circumference of the circle C from the estimated zero-point position $P_k$. Similarly, the previous valid data $\vec{V_{k-1}} = \vec{R_{k-1}} - \vec{E_{k-1}}$, which represents a vector pointing to the circumference of the circle C from the estimated zero-point position $P_{k-1}$.

Figure 14:
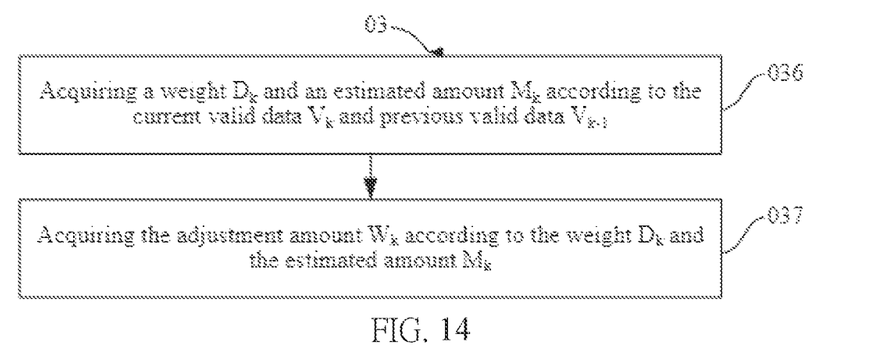
FIG. 14 is a schematic flowchart of a calibration method according to some implementations of this application.

Referring to FIG. 14, in some implementations, the method 03 of acquiring the adjustment quantity $W_k$ according to the current data and the previous data includes the following steps:

036: Acquiring a weight $D_k$ and an estimated quantity $M_k$ according to the current valid data $V_k$ and the previous valid data $V_{k-1}$.

037: Acquiring the adjustment quantity $W_k$ according to the weight $D_k$ and the estimated quantity $M_k$.

Referring to FIG. 2, in some implementations, the processor 30 may be further configured to perform the methods in 036 and 037. That is to say, the processor 30 may be further configured to: acquire the weight $D_k$ and the estimated quantity $M_k$ according to the current valid data $V_k$ and the previous valid data $V_{k-1}$, and acquire the adjustment quantity $W_k$ according to the weight $D_k$ and the estimated quantity $M_k$.

With reference to FIG. 8, Formula V, and Formula VI, in Formula V, $|\vec{R_k}|^2 - |\vec{R_{k-1}}|^2 = 2(\vec{R_k} - \vec{R_{k-1}})\vec{M_0}$, $\vec{R_k}$ and $\vec{R_{k-1}}$ may be acquired by the vector sensor 40 by measuring any vector. Therefore, a vector obtained by $\vec{R_k} - \vec{R_{k-1}}$ may be any vector in the space. That is to say, $\vec{M_k} = \vec{R_k} - \vec{R_{k-1}}$ in Formula VI substantially means representing, by using $M_k$, any vector obtained by $\vec{R_k} - \vec{R_{k-1}}$. In Formula V, $|\vec{R_k}|^2 - |\vec{R_{k-1}}|^2 = 2(\vec{R_k} - \vec{R_{k-1}})\vec{M_0}$, $|\vec{R_k}|^2 - |\vec{R_{k-1}}|^2$ reflects a degree of change in the posture of the vector sensor 40 during two measurements. That is to say, in Formula VI, $D_k = |\vec{R_k}|^2 - |\vec{R_{k-1}}|^2$ substantially means representing, by using $D_k$, the degree of change in the posture of the vector sensor 40 during the two measurements. If $\vec{V_k} - \vec{V_{k-1}}$ is used to represent any vector in the space, and $|\vec{V_k}| - |\vec{V_{k-1}}|$ is used to represent the degree of change in the posture of the vector sensor 40 during the two measurements, that is, $\vec{M_k} = \vec{V_k} - \vec{V_{k-1}}$, and $D_k = |\vec{V_k}| - |\vec{V_{k-1}}|$, Formula VII: $\vec{V_k} - \vec{V_{k-1}} = U(|\vec{V_k}| - |\vec{V_{k-1}}|) \vec{M_0}$ may be obtained from Formula VI, where U is a non-zero constant, $\vec{V_k} - \vec{V_{k-1}} = \vec{M_k}$, and $|\vec{V_k}| - |\vec{V_{k-1}}| = D_k$.

Figure 15:
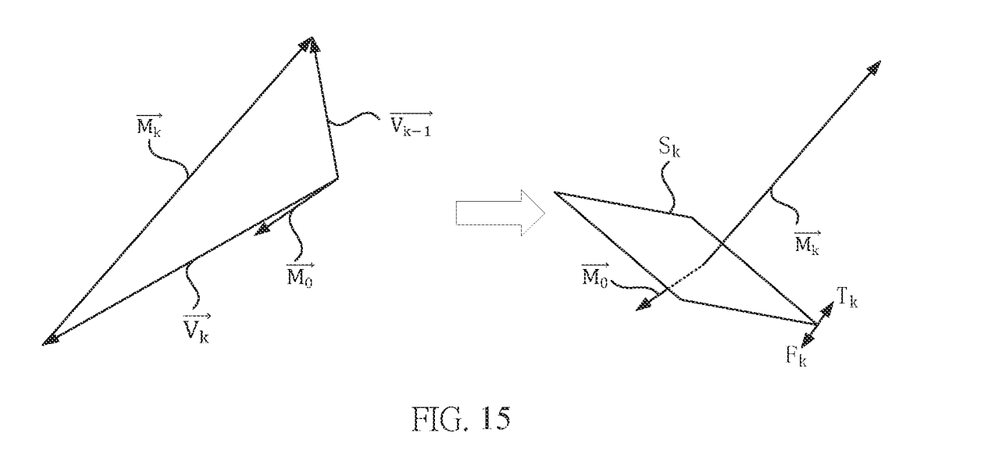
FIG. 15 is a schematic diagram of a scenario of acquiring a direction of a zero-point offset $M_O$ according to some implementations of this application.

Referring to FIG. 15 and FIG. 9, when $\vec{M_k} = \vec{V_k} - \vec{V_{k-1}}$, and $D_k = |\vec{V_k}| - |\vec{V_{k-1}}|$, a direction of $\vec{M_k}$ relative to the zero-point offset $\vec{M_0}$ can still be determined according to the sign of $D_k$, that is, a side, in the half-spaces segmented by the normal plane $S_k$ of $\vec{M_k}$, on which the direction of the zero-point offset $\vec{M_0}$ is located is determined. A detailed process is not described herein. In this way, when $\vec{M_k} = \vec{V_k} - \vec{V_{k-1}}$, and $D_k = |\vec{V_k}| - |\vec{V_{k-1}}|$, the direction of $\vec{W_k}$ can still be determined by using the sign of $D_k$ and the direction of $\vec{M_k}$, and the magnitude of $\vec{W_k}$ can still be determined by using $|\vec{W_k}| = \alpha |D_k| |\vec{M_k}|$. A detailed process is not described herein.

Referring to FIG. 8, in addition to the degree of change in the posture of the vector sensor 40 during the two measurements, $D_k = |\vec{V_k}| - |\vec{V_{k-1}}|$ may further represent a degree of calibration of the zero-point error. For example, if the zero-point error does not exist, the estimated zero-point position $P_{k-1}$, the estimated zero-point position $P_k$, and theoretical zero-point position $P_0$ in FIG. 8 coincide, $\vec{V_{k-1}} = A_1 \cdot \vec{Me}$, and $\vec{V_k} = A_2 \cdot \vec{Me}$. Therefore, $D_k = |\vec{V_k}| - |\vec{V_{k-1}}| = 0$. If the zero-point error exists, the estimated zero-point position $P_{k-1}$ and the estimated zero-point position $P_k$ are closer to the theoretical zero-point position $P_0$, which indicates a higher degree of calibration of the zero-point error. In this case, the value of $|\vec{V_k}| - |\vec{V_{k-1}}|$ is smaller, and $D_k$ is smaller. If the zero-point position $P_{k-1}$ and the estimated zero-point position $P_k$ are farther from the theoretical zero-point position $P_0$, which indicates a lower degree of calibration of the zero-point error, the value of $|\vec{V_k}| - |\vec{V_{k-1}}|$ is larger, and $D_k$ is larger. Method 035: When the weight $D_k$ is less than or equal to the preset threshold, the adjustment quantity $W_k$ is set to zero, that is to say, the current correction value $E_k$ is not adjusted when the degree of calibration of the zero-point error is relatively high, and it is considered that the calibration of the zero-point error satisfies the requirements. Method 034: When the weight $D_k$ is greater than the preset threshold, the adjustment quantity $W_k$ is obtained according to the weight $D_k$ and the estimated quantity $M_k$, to acquire the next correction value $E_{k+1}$ according to the current correction value $E_k$ and the adjustment quantity $W_k$, which is used to perform zero-point calibration during the next $((k+1)^{th})$ ranging.

Refer to Formula VI: $D_k = 2(\vec{M_k} \cdot \vec{M_0})$. The weight $D_k$ represents the degree of change in the posture of the vector sensor 40 during the two measurements. In some implementations, the weight $D_k$ may be determined according to the posture data. The posture data is data measured by other sensors that can represent the degree of change in the posture of the vector sensor 40 during the two measurements. In an embodiment, the posture data may be a first angular velocity and a second angular velocity measured by the angular velocity sensor during the two measurements performed by the vector sensor 40. A larger difference between the first angular velocity and the second angular velocity indicates a larger degree of change in the posture of the vector sensor 40 during the two measurements, and thereby indicates a larger determined weight $D_k$. A type of the posture data is not limited to a rate of change in the angular velocity of the vector sensor 40 during the two measurements, and is not limited herein.

Figure 17:
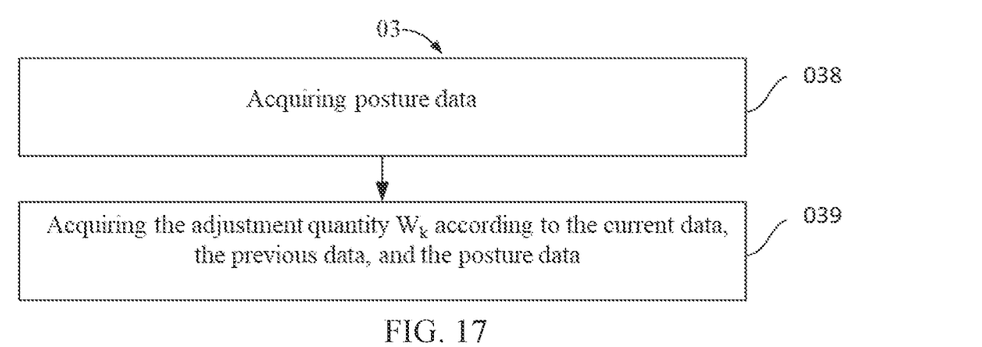
FIG. 17 is a schematic flowchart of a calibration method according to some implementations of this application.

Specifically, referring to FIG. 17, in some implementations, the method 03 of acquiring the adjustment quantity $W_k$ according to the current data and the previous data includes the following steps:

038: Acquiring posture data.

039: Acquiring the adjustment quantity $W_k$ according to the current data, the previous data, and the posture data.

Referring to FIG. 2, in some implementations, the processor 30 may be further configured to perform the methods in 038 and 039. That is to say, the processor 30 may be further configured to acquire the posture data, and acquire the adjustment quantity $W_k$ according to the current data, the previous data, and the posture data.

Specifically, the adjustment quantity $W_k$ depends on the weight $D_k$ and the estimated quantity $M_k$, the weight $D_k$ depends on the posture data, and the estimated quantity $M_k$ depends on the current data and the previous data. Based on the above, if the current data and the previous data are respectively the current original data $\vec{R}_k$ and the previous original data $\vec{R}_{k-1}$, $\vec{M}_k = \vec{R}_k - \vec{R}_{k-1}$. If the current data and the previous data are respectively the current valid data $V_k$ and the previous valid data $V_{k-1}$, $\vec{M}_k = \vec{V}_k - \vec{V}_{k-1}$.

In conclusion, according to the calibration method and the UAV 100 in the implementations of this application, the adjustment quantity $W_k$ may be acquired according to the current data and the previous data, and the next correction value $E_{k+1}$ may be acquired according to the current correction value $E_k$ and the adjustment quantity $W_k$, to acquire a more accurate correction value, so as to perform zero-point error calibration on the next original data $R_{k+1}$ according to the next correction value $E_{k+1}$ during a next measurement to acquire next valid data $V_{k+1}$ more closely approximating to a true value.

According to the calibration method and the UAV 100 in the implementations of this application, zero-point calibration may be performed during output of the valid data. Specifically, zero-point calibration may be performed during any $k^{th}$ measurement, so as to dynamically complete zero-point calibration during the use of the vector sensor 40, thereby maintaining the accuracy of the valid data.

Figure 16:
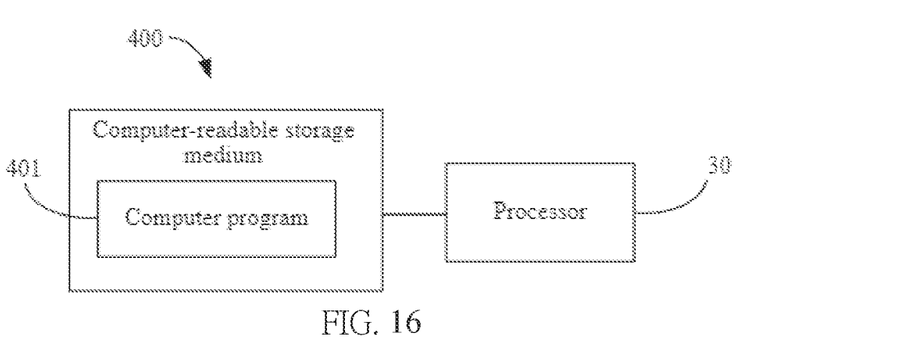
FIG. 16 is a schematic diagram of a connection status between a computer-readable storage medium and a processor according to some implementations of this application.

Referring to FIG. 16, an implementation of this application further provides a non-transitory computer-readable storage medium 400 including a computer program 401. When the computer program 401 is executed by one or more processors 30, the one or more processors 30 are caused to perform the calibration method described in any of the above implementations. The non-transitory computer-readable storage medium 400 may be disposed in the UAV 100, or may be disposed in a cloud server or other apparatuses. In this case, the UAV 100 can communicate with the cloud server or the other apparatuses to acquire the corresponding computer program 401.

Referring to FIG. 2, for example, when the computer program 401 is executed by one or more processors 30, the one or more processors 30 are caused to perform the methods in 01, 02, 03, 04, 05, 06, 011, 031, 032, 033, 034, 035, 036, 037, 038, and 039. For example, the following application calibration method is performed.

01: Collecting, during a flight of the UAV 100, a current correction value $E_k$ and current data during a current measurement performed by the vector sensor 40.

02: Acquiring previous data during a previous measurement performed by the vector sensor 40.

03: Acquiring an adjustment quantity $W_k$ according to the current data and the previous data.

04: Acquiring a next correction value $E_{k+1}$ according to the current correction value $E_k$ and the adjustment quantity $W_k$.

05: Acquiring next original data $R_{k+1}$ during a next measurement performed by the vector sensor 40, and acquiring next valid data $V_{k+1}$ according to the next original data $R_{k+1}$ and the next correction value $E_{k+1}$.

06: Controlling headings and postures of the UAV 100 according to the next valid data $V_{k+1}$.

In another example, when the computer program 401 is executed by one or more processors 30, the one or more processors 30 are caused to perform the following calibration method.

01: Collecting, during a flight of the UAV 100, a current correction value $E_k$ and current data during a current measurement performed by the vector sensor 40.

02: Acquiring previous data during a previous measurement performed by the vector sensor 40.

031: Acquiring a weight $D_k$ and an estimated quantity $M_k$ according to the current original data $R_k$ and the previous original data $R_{k-1}$.

032: Acquiring an adjustment quantity $W_k$ according to the weight $D_k$ and the estimated quantity $M_k$;

034: When the weight $D_k$ is greater than a preset threshold, acquiring the adjustment quantity $W_k$ according to the weight $D_k$ and the estimated quantity $M_k$.

035: When the weight $D_k$ is less than or equal to the preset threshold, setting the adjustment quantity $W_k$ to zero.

04: Acquiring a next correction value $E_{k+1}$ according to the current correction value $E_k$ and the adjustment quantity $W_k$.

05: Acquiring next original data $R_{k+1}$ during a next measurement performed by the vector sensor 40, and acquiring next valid data $V_{k+1}$ according to the next original data $R_{k+1}$ and the next correction value $E_{k+1}$.

06: Controlling headings and postures of the UAV 100 according to the next valid data $V_{k+1}$.

In the descriptions of this specification, descriptions of reference terms such as "some implementations", "in one example", or "exemplarily" mean that specific characteristics, structures, materials, or features described with reference to the implementation or example are included in at least one implementation or example of this application. In this specification, schematic descriptions of the foregoing terms are not necessarily with respect to the same implementation or example. Further, the described specific characteristics, structures, materials, or features may be combined in a proper manner in any one or more implementations or examples. In addition, different embodiments or examples described in this specification, as well as features of different embodiments or examples, may be integrated and combined by a person skilled in the art without contradicting each other.

Any process or method in the flowcharts or described herein in another manner may be understood as indicating a module, a segment, or a part including code of one or more executable instructions for implementing a particular logical function or process step. In addition, the scopes of preferred embodiments of this application include other implementations which do not follow the order shown or discussed, including performing, according to involved functions, the functions basically simultaneously or in a reverse order, which should be understood by a person skilled in the art to which the embodiments of this application belong.

Although the embodiments of this application are shown and described above, it may be understood that the foregoing embodiments are exemplary, and cannot be understood as a limitation to this application. A person of ordinary skill in the art may make changes, modifications, replacements, and variations to the foregoing embodiments without departing from the scope of this application.

What is claimed is:

1. An unmanned aerial vehicle (UAV), comprising:
at least one electric motor being electronically connected with at least one electronic speed controllers (ESC);
a vector sensor for measuring headings data and postures data of the UAV; and
one or more processors configured to:
collect, during a flight of the UAV, a current correction value-Ex and current data during a current measurement performed by the vector sensor, wherein the current data comprises current original data;
acquire previous data during a previous measurement performed by the vector sensor, wherein the previous data comprises previous original data;
acquire a weight and an estimated quantity according to the current original data and the previous original data;
acquire an adjustment quantity according to the weight and the estimated quantity;
acquire a next correction value according to the current correction value and the adjustment quantity, and acquire next original data during a next measurement performed by the vector sensor, and acquire next valid data according to the next original data and the next correction value; and
calibrate the heading data and the postures data of the UAV according to the next valid data;
generate a control command according to the calibrated heading data and the calibrated posture data of the UAV; and
wherein the ESC is configured to control the at least one electric motor to drive flying motion parts of the UAV according to the control command, so as to translate or rotate the UAV that headings and postures of the UAV are adjusted to achieve navigation calibration during the flight of the UAV.

2. The unmanned aerial vehicle (UAV) according to claim 1, wherein a posture of the vector sensor during the previous measurement is different from a posture of the vector sensor during the current measurement.

3. The unmanned aerial vehicle (UAV) according to claim 1, wherein the current data further comprises current valid data; and
the one or more processors are further configured to acquire the current valid data according to the current original data and the current correction value.

4. The unmanned aerial vehicle (UAV) according to claim 3, wherein the previous data comprises previous valid data; and
the one or more processors are further configured to:
acquire the weight and the estimated quantity according to the current valid data and the previous valid data.

5. The unmanned aerial vehicle (UAV) according to claim 1, wherein the one or more processors are further configured to:
acquire the posture data; and
acquire the adjustment quantity according to the current data, the previous data, and the posture data.

6. The unmanned aerial vehicle (UAV) according to claim 1, wherein the one or more processors are further configured to: when the weight is greater than a preset threshold, acquire the adjustment quantity according to the weight and the estimated quantity; and
when the weight is less than or equal to the preset threshold, set the adjustment quantity to zero.

7. A calibration method for navigation of an unmanned aerial vehicle (UAV), the calibration method comprising:
collecting, during a flight of the UAV, a current correction value-Ex and current data during a current measurement performed by the vector sensor;
acquiring heading data and posture data of the UAV measured by the vector sensor;
acquiring previous data during a previous measurement performed by the vector sensor, wherein the previous data comprises previous original data;
acquiring a weight and an estimated quantity according to the current original data and the previous original data;
acquiring an adjustment quantity according to the weight and the estimated quantity;
acquiring a next correction value according to the current correction value and the adjustment quantity, and acquiring next original data during a next measurement performed by the vector sensor, and acquiring next valid data according to the next original data and the next correction value;
calibrating the heading data and the postures data of the UAV according to the next valid data;
generating a control command according to the calibrated heading data and the calibrated posture data of the UAV; and
controlling at least one electric motor of the UAV to drive flying motion parts of the UAV according to the control command, so as to translate or rotate the UAV that headings and postures of the UAV are adjusted to achieve navigation calibration during the flight of the UAV.

8. The calibration method according to claim 7, wherein a posture of the vector sensor during the previous measurement is different from a posture of the vector sensor during the current measurement.

9. The calibration method according to claim 7, wherein the current data further comprises current valid data; and
the collecting the current correction value and the current data during the current measurement performed by the vector sensor comprises acquiring the current valid data according to the current original data and the current correction value.

10. The calibration method according to claim 9, wherein the previous data further comprises previous valid data; and
the acquiring the adjustment quantity according to the current data and the previous data further comprises:
acquiring the weight and the estimated quantity $M_k$ according to the current valid data and the previous valid data.

11. The calibration method according to claim 7, further comprising:
acquiring posture data; and
acquiring the adjustment quantity according to the current data, the previous data, and the posture data.

12. The calibration method according to claim 7, wherein the acquiring the adjustment quantity according to the current data and the previous data comprises:
when the weight is greater than a preset threshold, acquiring the adjustment quantity according to the weight and the estimated quantity; and
when the weight is less than or equal to the preset threshold, setting the adjustment quantity to zero.

13. A non-transitory computer-readable storage medium, storing a computer program, wherein when the computer program is executed by one or more processors, the one or more processors perform a calibration method for navigation of an unmanned aerial vehicle (UAV), the calibration method comprising:
- collecting, during a flight of the UAV, a current correction value and current data during a current measurement performed by the vector sensor;
- acquiring heading data and posture data of the UAV measured by the vector sensor;
- acquiring previous data during a previous measurement performed by the vector sensor, wherein the previous data comprises previous original data;
- acquiring a weight and an estimated quantity according to the current original data and the previous original data;
- acquiring an adjustment quantity according to the weight and the estimated quantity;
- acquiring a next correction value according to the current correction value and the adjustment quantity, and acquiring next original data during a next measurement performed by the vector sensor, and acquiring next valid data according to the next original data and the next correction value;
- calibrating the heading data and the posture data of the UAV according to the next valid data;
- generating a control command according to the calibrated heading data and the calibrated posture data of the UAV; and
- controlling at least one electric motor of the UAV to drive flying motion parts of the UAV according to the control command, so as to translate or rotate the UAV that headings and postures of the UAV are adjusted to achieve navigation calibration during the flight of the UAV.

14. The non-transitory computer-readable storage medium according to claim 13, wherein a posture of the vector sensor during the previous measurement is different from a posture of the vector sensor during the current measurement.

15. The non-transitory computer-readable storage medium according to claim 13, wherein the current data further comprises current valid data; and
- the collecting the current correction value EL and the current data during the current measurement performed by the vector sensor further comprises acquiring the current valid data according to the current original data and the current correction value.

16. The non-transitory computer-readable storage medium according to claim 15, wherein the previous data further comprises previous valid data; and
- the acquiring the adjustment quantity according to the current data and the previous data comprises:
- acquiring a weight and an estimated quantity according to the current valid data and the previous valid data.

17. The non-transitory computer-readable storage medium according to claim 13, wherein the method further comprises:
- acquiring the posture data; and
- acquiring the adjustment quantity according to the current data, the previous data, and the posture data.

18. The non-transitory computer-readable storage medium according to claim 13, wherein the acquiring the adjustment quantity according to the current data and the previous data comprises:
- when the weight is greater than a preset threshold, acquiring the adjustment quantity according to the weight $D_k$ and the estimated quantity; and
- when the weight is less than or equal to the preset threshold, setting the adjustment quantity to zero.

* * * * *